(12) United States Patent
Alvarez et al.

(10) Patent No.: US 7,778,476 B2
(45) Date of Patent: Aug. 17, 2010

(54) SYSTEM AND METHOD FOR TRANSFORM CODING RANDOMIZATION

(75) Inventors: Jose Roberto Alvarez, Sunnyvale, CA (US); Jiangtao (Gene) Wen, La Jolla, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 957 days.

(21) Appl. No.: 11/255,661

(22) Filed: Oct. 21, 2005

(65) Prior Publication Data

US 2007/0092146 A1 Apr. 26, 2007

(51) Int. Cl.
*G06K 9/36* (2006.01)
*G06K 9/46* (2006.01)
*G06K 9/38* (2006.01)
*H04B 1/66* (2006.01)
*H04N 11/02* (2006.01)
*H04N 11/04* (2006.01)
*H04N 7/12* (2006.01)

(52) U.S. Cl. ............... 382/236; 382/250; 382/251; 375/240.03

(58) Field of Classification Search ............ 382/236, 382/250, 251; 375/240.03
See application file for complete search history.

(56) References Cited

U.S. PATENT DOCUMENTS

| | | | | |
|---|---|---|---|---|
| 5,589,829 A | * | 12/1996 | Astle | 341/67 |
| 5,781,788 A | * | 7/1998 | Woo et al. | 712/1 |
| 7,082,221 B1 | * | 7/2006 | Jiang | 382/239 |
| 7,327,785 B2 | * | 2/2008 | Bjontegaard | 375/240.03 |
| 2004/0170395 A1 | * | 9/2004 | Filippini et al. | 386/111 |
| 2005/0180502 A1 | * | 8/2005 | Puri | 375/240.03 |
| 2006/0013312 A1 | * | 1/2006 | Han | 375/240.19 |
| 2006/0126724 A1 | * | 6/2006 | Cote et al. | 375/240.03 |
| 2008/0080615 A1 | * | 4/2008 | Tourapis et al. | 375/240.03 |

OTHER PUBLICATIONS

Wedi et al., "Quantization with an Adaptive Dead Zone Size for H.264/AVC FRExt", JVT of ISO/IEC MPEG & ITU-T VCEG, Document JVT-K026, Mar. 2004.*

Sullivan, "Adaptive quantization encoding technique using an equal expected-value rule", JVT of ISO/IEC MPEG & ITU-T VCEG, Document JVT-N011, Jan. 2005.*

* cited by examiner

*Primary Examiner*—Samir A Ahmed
*Assistant Examiner*—Li Liu
(74) *Attorney, Agent, or Firm*—North Weber & Baugh LLP (57) ABSTRACT

A method and system are provided where image data is encoded in the spatial domain, and transformed in a two dimensional transform process to thereby recover a frequency domain representation of the image data. The frequency domain representation is then quantized to obtain an integer representation. The integer representation is ordered by frequency. Then, the hi-frequency coefficients are recreated and intelligently randomized at selective frequencies. This provides high quality encoded picture results, with fewer artifacts than those that would result from conventional approaches afflicted by artifacts due to loss of high frequencies.

54 Claims, 3 Drawing Sheets

SYSTEM AND METHOD FOR TRANSFORM CODING RANDOMIZATION

BACKGROUND

In a typical hybrid video coding system, a two dimensional transform converts image data or motion-compensated residual data from the spatial domain to the frequency domain. The data is thus de-correlated and arranged is such a way that most of the information is concentrated in specific two-dimensional regions on the transform.

The discrete cosine transform (DCT) can be defined as $$Y = AXA^T \tag{1.1}$$

The inverse DCT is defined as $$X = A^T YA \tag{1.2}$$

Where X is a matrix of samples, Y is a matrix of coefficients (or levels) and A is a transform N×N matrix.

After the image samples are converted to the transform domain, the coefficients, Y, thus obtained are quantized to integer values for further processing and transmission. The process of quantization is performed on the coefficients Y obtained above.

Quantization can be considered as a reduction in the range of values of an input signal. Each sample of the input signal is mapped to one quantized output value. One basic example of this type of scalar quantization is the rounding of a fractional value to the nearest integer. Simple rounding is an example of a linear quantizer.

A formula for determining a rounded integer value is as follows:

$$I = \text{round}(Y/Q_{step}) \tag{1.3}$$

Where I is the quantized output, Y is the fractional input and the quantizer step ($Q_{step}$) is the quantization step size. The quantized output levels will be spaced uniformly in intervals of quantizer parameter (QP).

Inverse quantization is the reverse and lossy process where the closest value to the original fractional value is obtained.

$$I' = I \cdot Q_{step} \tag{1.4}$$

Transform and Quantization in H.264

The H.264 coding standard uses an integer transform instead of the traditional DCT. The original proposal for transform and quantization can be found in "Low Complexity Transform and Quantization—Part I: Basic Implementation", by Hallapuro, Karczewicz, Malvar, JVT 038 of ISO/IEC MPEG & ITU-T VCEG, Geneva, January 2001. For practical purposes the three types of transforms used in the standard are close approximations to the DCT. Depending on the type of residual data to be coded the standard specifies the following:

a) Integer 4×4 transform for all blocks of data with the following extensions:
b) Hadamard 4×4 transform for Luma discrete cosine (DC) coefficients (obtained in (a)) in INTRA macroblocks predicted as Intra1 16×16 mode.
c) Hadamard 2×2 transform for Chroma DC coefficients (obtained in (a)) in ANY macroblock prediction.

Integer 4×4 Transform

The advantages of the integer over the DCT are primarily practical application advantages, since, theoretically, the use of the integer is not as efficient as the DCT. However, the integer approach, for example, requires only 16-bit operations in most cases. Also, the integer approach ensures that there is no mismatch between an encoder and a decoder since it is fully defined. Y is defined as follows:

$$Y = (CXC^T) \otimes E \tag{1.5}$$

Where, $$C = \begin{pmatrix} 1 & 1 & 1 & 1 \\ 2 & 1 & -1 & -2 \\ 1 & -1 & -1 & 1 \\ 1 & -2 & 2 & -1 \end{pmatrix} \quad E = \begin{pmatrix} a^2 & \frac{ab}{2} & a^2 & \frac{ab}{2} \\ \frac{ab}{2} & \frac{b^2}{4} & \frac{ab}{2} & \frac{b^2}{4} \\ a^2 & \frac{ab}{2} & a^2 & \frac{ab}{2} \\ \frac{ab}{2} & \frac{b^2}{4} & \frac{ab}{2} & \frac{b^2}{4} \end{pmatrix} \tag{1.6}$$

The operator $\otimes$ above indicates that every element of the core transform $CXC^T$ is multiplied by the corresponding element of the scaling matrix E. Thus, normal matrix multiplication is not used. The elements of E are defined as follows:

$$a = \tfrac{1}{2} b = mt; epmrl; \sqrt{2/5} rlxmx \tag{1.7}$$

Quantization

The H.264 coding standard uses a scalar quantizer of the basic form:

$$L = \text{round}(Y_{ij}/Q_{step}) \tag{1.8}$$

There are 52 values of $Q_{step}$ defined by the standard. These values are not actually transmitted, but they are indexed into a table of $Q_{step}$ values assumed by both the encoder and decoder, and thus incorporated by design. The index transmitted, QP, is such that the quantization step doubles with every QP increment of 6.

Matrix E above is used as a scaling factor (SF) after the core transform is performed on the input sample values. If the unscaled coefficient levels are denoted as $K = CXC^T$, then each element of K is quantized and scaled as follows:

$$L = \text{round}\left(K_{ij} \cdot \frac{SF}{Q_{step}}\right) \tag{1.9}$$

Where SF can take the values $a^2$, $ab/2$ or $b^2/2$ as indicated by matrix E

Practical implementations in fixed point arithmetic transform the equation for L above into a binary shifted implementation to avoid costly division and to preserve accuracy $$|L_{ij}| = \left(\left(|K_{ij}| \cdot \frac{(SF \cdot 2^{qbits})}{Q_{step}}\right) + (f \cdot 2^{qbits})\right) / 2^{qbits} \tag{1.10}$$

$$\text{sign}(L_{ij}) = \text{sign}(K_{ij})$$

Where $$qbits = 15 + \text{floor}(QP/6) \tag{1.11}$$

where f is a fraction typically less than 1, e.g., ⅓, ⅙, etc; floor(x) is the greatest integer less than or equal to x; and QP is the quantization index parameter, 0<=QP<52.

This type of non-linear quantizer has a region around L=0 where small fractions are mapped to zero. This region is known as a Dead Zone. The size of the Dead Zone can be controlled by the parameter f in the above equation for L. Hereinafter, f is defined as the Dead Zone offset. The value of f should usually be non-negative. A value of f=0.5 corresponds to the conventional rounding operation with no deadzone, while the smaller the f, the more K will be quantized to 0, therefore the wider the deadzone.

There are many methods of performing rounding in the dead zone area. The purpose of rounding is to reduce the amount of data that represents the quantized value, for example, to round an 11 bit quantized result up or down to an integer to an 8 bit integer. For example, if the offset is set to round values 0.5 and over rounded up to 1, and values less than 0.5 rounded down to 0. Thus, a value of 0.6 could be rounded up to a value of 1, and 0.2 could be rounded down to a 0. This reduces the amount of data that needs to be transmitted, displayed or otherwise processed. The question then becomes, at which level is the dead zone offset chosen? Thus, the dead zone offset determines which values are quantized to a value of zero, and which are quantized to non-zero value.

The choice of which threshold point to pick is a design question. For example, instead of 0.5, 0.3 could be the point of the threshold. With a lower threshold, more fractional portions of the transformed blocks would be rounded from zero to a non-zero integer. Thus, 0.5 would be rounded to 1 and 0.2 would be rounded to 0. In this case, statistically, more fractional components would likely be rounded up to an integer. In particular, many pixels located around the dead zone would be rounded to +/−1. Also, more detail would be represented, and thus more data bits representing the block would result from more numbers being rounded up. Therefore, depending on which point is chosen as the threshold point, more or less detail would be represented, and more or less bits would be required to represent the respective detail.

In practice, rigidly choosing a threshold leaves the designer with the difficult task of balancing the quality of the resulting video picture with the number of digital bit representations that are limited by the bit rate of a system. If too many bits are generated for a system to process, then the system must be designed with a higher threshold that will reduce the number of bits. If higher quality is desired, then a lower threshold is used, and more data bits result.

Furthermore, by rigidly choosing a threshold value, blurry or flat blocks of video occur in areas of high texture or high motion. For example, if a sweater having particular weave pattern were recorded in a video process that chooses a strict threshold, a low threshold will show details of the pattern, but at a high bit rate. Conversely, a high threshold would result in a less detailed video representation, and the weave pattern may not even be apparent to a viewer. If the same pattern or texture is in motion from one video slice to the next, a similar result occurs. A higher threshold gives bland or blurry video representations at a given system bit rate limit. And, a lower threshold gives a more detailed representation of the image, but produces more digital bit representations that may not be within the bit rate of the system. The result: blurry and/or inconsistent blocks of video within video slices in areas of high texture and/or motion.

Intra 16×16 DC Transform and Quantization

For macroblocks coded as Intra 16×16, in addition to the integer transform described above, there is a further transformation applied to the DC coefficients of all the 4×4 transformed blocks in the macroblock. The DC value of each of the 16 transformed 4×4 matrices is extracted as a 4×4 matrix $K_{DC}$ and transformed as follows.

$$Y_{DC} = (HK_{DC}H^T)/2 \quad (1.12)$$
Where,

-continued
$$H = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \quad (1.13)$$

Where, H, the Hadamard transform above, is used instead of the integer transform to simplify operations on the DC coefficients. The coefficients $Y_{DC}$ are quantized in a similar manner as the integer transform coefficients as follows.

$$|L_{DCij}| = \left(\left(|K_{DCij}| \cdot \frac{(SF_{DC} \cdot 2^{qbits})}{Q_{step}}\right) + (f_{DC} \cdot 2^{qbits})\right) \Big/ 2^{qbits} \quad (1.14)$$

$$\text{sign}(L_{DCij}) = \text{sign}(K_{DCij})$$

Where $SF_{DC}$ takes the value $a^2$ as defined as above, qbits is defined above, and $f_{DC}$ is defined as the Dead Zone offset.

Chroma DC Transform and Quantization

Similarly to Luma sample (residual) processing, all of the chroma samples (residuals) are processed by the 4×4 integer transform. The DC coefficient of each 4×4 block is extracted to form a 2×2 matrix $K_{cDC}$ and further transformed as follows.

$$UV_{DC} = c \cdot K_{cDC} \cdot c^T \quad (1.15)$$
Where $$c = \begin{pmatrix} 1 & 1 \\ 1 & -1 \end{pmatrix} \quad (1.16)$$

The quantization of the Chroma DC coefficients is described below $$|L_{cDCij}| = \left(\left(|UV_{cDCij}| \cdot \frac{(a^2 \cdot 2^{qbits})}{Q_{cstep}}\right) + (f_{cDC} \cdot 2^{qbits+1})\right) \Big/ 2^{qbits+1} \quad (1.17)$$

$$\text{sign}(L_{cDCij}) = \text{sign}(UV_{cDCij})$$

The H.264 coding standard provides general methods and tools to encode image sequences. At low bit rates, rate-distortion driven decisions in the encoder select coding modes that are less expensive to code rather than modes that provide less distortion. In this situation, larger 16×16 modes are more likely to be selected since they can be coded with less bits than the smaller 8×8 and 4×4 modes.

In some cases, an Intra 16×16 mode will produce fewer bits than an Inter 16×16 mode in temporally predicted slices. The Intra 16×16 mode typically selected in this situation has very low frequency information and often has only DC information. Although this implementation choice is efficient in conventional processes, it can produce macroblocks with very low detail and that appear blurred.

When these blurred macroblocks appear in areas of the picture with high detail, especially in a picture with motion detail, the perceived quality is inconsistent, since neighboring macroblocks may be coded in other more efficient modes. Or, if neighboring blocks are coded similarly, they can produce large areas full of blurred macroblocks. One approach to solving this problem is to add noise to the rounding process know as "film grain". This produces grainy noise patterns to fill in flat or blurry images with grainy textures that may be less apparent to a viewer than what would otherwise be apparent. This approach still does not adequately solve the problem of blurred images or images that are otherwise not representative of the recorded images.

Therefore, there exists a need for an improved method and system for encoding video pictures that overcomes the shortcomings of the prior art. As will be seen, the invention provides such a method and system in an elegant manner.

DETAILED DESCRIPTION

According to the method, system and program product of the invention, an image can be produced that has the perception by a viewer of high detail without the need to completely reproduce the image in explicit detail. The invention is directed to a novel method and system for transform coding randomization. According to the invention, a novel method and system are configured to break the pattern of flat or blurry blocks in a picture in order to create a more consistent appearance in areas of high motion and/or detail. In particular, the method and system accomplish this by modifying the quantization Dead Zone through manipulation of the offsets f and $f_{DC}$ in equations 1.10 and 1.14, defined herein as the DZMatrix control. The invention further accomplishes this by modifying the transform coefficient level L and $L_{DC}$ obtained after quantization in the same equations, defined herein as LevelZero control. The level zero control may be applied differently in intra blocks compared to inter blocks. These two modes of operation are referred to below as the dead zone mode and the level zero mode respectively. According to the invention, modifying the offsets and the transform coefficient levels provides a resulting picture with improved detail in areas of high detail and motion content in the video presentation.

In one embodiment, the invention is directed to overcoming the problem of blurry, inconsistent or otherwise deficient blocks that are not representative of the image being recorded by manipulating the threshold values in the dead zone. In contrast to conventional approaches, a rigid rounding threshold value is not chosen as a benchmark for rounding. Rather, the value dynamically changes in a random manner. In particular, this is done by encoding blocks in a manner that manipulates the offsets of f and $f_{DC}$, in equations 1.10 and 1.14 above to add detail in areas that would appear blurred using conventional methods. This is coined as the dead zone randomization mode. Generally, the process identifies the P (previous) and B (bidirectional) blocks, establishes a probability value that defines the probability of whether the blocks are randomized, then changes the offsets in a random and intelligent manner when the circumstances permit. The blocks can be any size prescribed by the standard, and in this description, they are sometimes referred to as macroblocks to indicate the largest two-dimensional block of data defined by the coding standard.

When in this dead zone randomization mode, the rounding would occur about a threshold value that is chosen at random. For example, the threshold can be chosen from within a range in a random manner. Thus, rather than having a rigid threshold value to decide between zero and non-zero values in the dead zone, the value is chosen at random to add detail and to visually break up blurry or inconsistent blocks, improving the video representation. As a result, the blocks that would be viewed as blurry or inconsistent in comparison with adjacent blocks would be enhanced with detail. Moreover, this would be accomplished without significantly increasing the amount of bits that represent the blocks. Thus, the detail is enhanced without needing to completely represent the texture and motion in any one slice or series of slices.

As described herein, image data is encoded in the spatial domain, transforming the image data in a two dimensional transform process. This recovers a frequency domain representation of the image data. The frequency domain representation of the image is then quantized to obtain an integer representation of the image data. The integer representation is ordered by frequency. The process then recreates and randomizes hi-frequency coefficients at selective frequencies. According to the invention, these coefficients add detail to a block, and can best remove the perceptual artifacts created by loss of hi-frequency coefficients. A high quality encoded picture results, with substantially reduced artifacts compared to prior art approaches. According to the invention, it is not necessary to obtain an exact reproduction of the lost high frequency coefficients, but the final picture quality is greatly improved.

In another embodiment, after the coefficients are quantized, the coefficients that are quantized to zero are analyzed (or a criteria such as the percentage of coefficients that are quantized to zero can be set so that only blocks that met the criteria are analyzed), and a selective subset of coefficients are intelligently re-computed to add visual details to the reconstructed images and/or breakup large areas of blurriness. The resulting video presentation appears to be a reproduction of each recorded image, but is rather a recorded version of the image that appears more detailed to the viewer. This would give a system the ability to enhance blocks that may appear blurry, flat, inconsistent with adjacent blocks, or otherwise not adequately representative of the recorded image.

Intra blocks are identified. Once identified, the intra blocks having a coefficient value of zero are randomly changed to a +/−1, that is, changed to a positive integer value of 1 or a negative integer value of 1. According to the invention, the value to which the zero coefficients are changed according to a given probability can also be of amplitudes other than 1. The embodiments refer to a value of 1 for simplicity of explanation. However, those skilled in the art will understand that the underlying invention is not limited to a particular amplitude value, and which amplitude value to choose depends on a particular application. The ability to change the zero to a positive or negative value can be accomplished by changing the zero value to a non-zero value, a value of 1 for example, before the process step of sign extension. According to the invention the probability of whether the zero is changed, the intra block randomization probability can be predetermined, or it can be dynamically changed. In either case, the changing of the zeros in this process adds detail to an otherwise less representative block recording of the original image. Furthermore, particularly for intra blocks, if their quality can be improved, the quality can be perpetuated, giving a high fidelity video presentation.

In another yet related embodiment, after inter blocks are identified, the inter blocks having a zero value are randomly changed to a +/− non-zero value, that is, changed to a positive integer value or a negative integer value, a +/−1 for example. Again, this can be accomplished by changing the zero value to a value of 1 before the process step of sign extension. According to the invention the probability of whether the zero value is changed to a non-zero value, the inter block randomization probability, can be predetermined or it can be dynamically changed. In either case, the changing of the zeros in this process produces a block that has better detail, and is more representative of the original image that was recorded.

Probability of intra and inter blocks can be set separately. For example, the intra block probability can be set high, and the inter block probability set low, thus increasing the probability that intra blocks will be randomized over inter blocks. In fact, the inter block randomization could effectively be disabled by setting the probability level very low. In a preferred embodiment, the probability assigned to the intra blocks should typically be a greater value than that assigned to the inter blocks.

In general, the embodiments described herein can be used in conjunction with other conventional processes. For example, the above examples can also be used in conjunction with adding a small random value to the coefficients prior or after quantization without examining the quantized values of the original transform coefficients. The random value can be set individually for each coefficient and each block or mode. Those skilled in the art will understand that the invention can be utilized in conjunction with these and other processes known in the art to increase or otherwise improve the of information in a reconstructed block.

As discussed in the background, in areas in the picture where there is a large amount of detail, particularly during periods of high motion, conventional methods produce blurred macroblocks that appear in areas of the picture in place of the high detail, particularly in a picture with motion detail. The perceived quality is inconsistent within a video scene, since neighboring macroblocks (less detail and/or motion) may be coded in other more efficient modes. Or, if the disparate regions (high detail in contrast to low detail) are coded similarly, they produce large areas full of blurred macroblocks. One approach to solving this problem is to add noise to the rounding process, which is performed in the spatial domain. This conventional approach still does not adequately solve the problem of blurred images, and details are lost. According to the invention, better detail is provided in these regions, and blurry and inconsistent blocks are substantially reduced, producing a video presentation of better detail and consistency.

It has been observed that it is often the case that, although the loss of hi-frequency coefficients is the cause of the creation blurred blocks, exact reproduction of the lost hi-frequency coefficients is not required to improve the visual quality of the video. Rather than replacing the lost high frequency blocks, increasing the amount of detail in the reconstructed blocks can greatly improve the perceived video presentation to a viewer. Thus, the invention provides a novel system and method that enables an. encoder to intelligently and randomly recreate hi-frequency coefficients at selective frequencies. These select frequencies require fewer bits to code and can best remove the perceptual artifacts created by loss of hi-frequency coefficients. A quality encoded picture results, with reduced artifacts that would result from conventional approaches to lost high frequency artifacts. According to the invention, exact reproductions are not made of the lost high frequency coefficients. From the coefficient reproduction perspective, such processing may appear to be a randomization process. However, the process is an intelligent one that is able to produce an improved image, rather than the deficient areas that would typically result using conventional methods.

Figure 1:
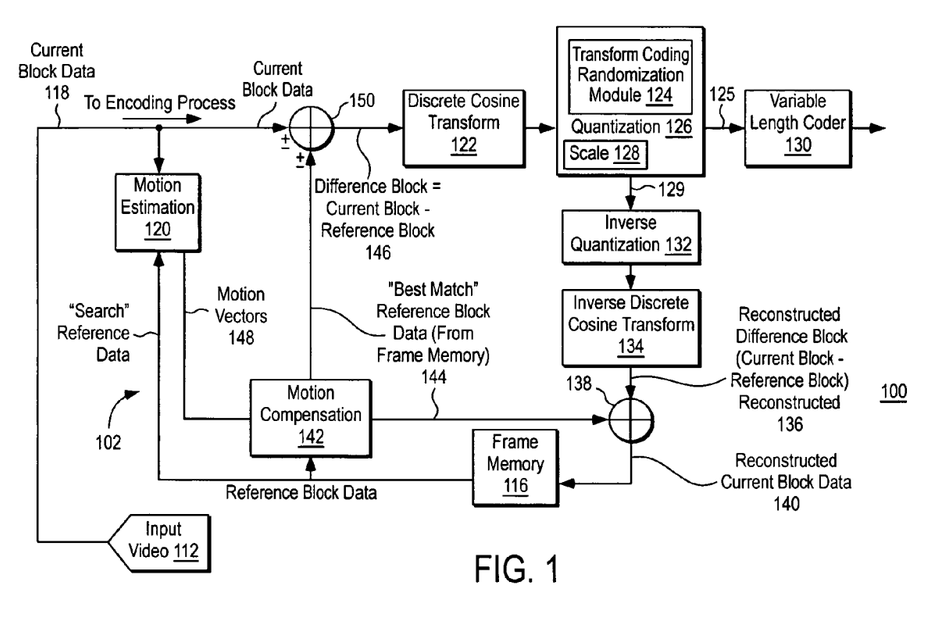
FIG. 1 is a diagrammatic view of an encoder embodying the invention.

Referring to FIG. 1, an encoder embodying the invention is illustrated. In operation, a video input is received by encoder 102. Aside from the system and methods provided according to the invention, the encoder system as illustrated is intended as a generic encoder system, and any encoder system may be configured with the novel components and functions according to the invention. The encoder 102 as illustrated receives the input 118 that is then processed in the encoder, which begins and ends at adder 150, to produce an improved output video bitstream. The novel method and system of quantization of the invention is compliant with any coding standards such as MPEG, MPEG2, H.264, and other standards, as the mechanisms of picture improvement are restricted to the encoder side of the video process and, therefore, do not change the syntax and semantics of existing compression standards. To elaborate, the encoder illustrated in FIG. 1 includes an adder 150 that receives an input 112 where the adder transmits a result to discrete cosine transformer 122 receiving an input signal, and a transformer 124 that may be included within a quantizer 126.

According to the invention, the quantizer 126 further includes a transform coding randomization module 124. This randomization module operates according to the methods discussed below, and can exist either as an incorporated part of a standard quantizer, or as a separate component, and may be incorporated in software, hardware or a combination of the two. According to the invention, the quantization module performs a novel randomization method within the quantization process to reduce blurry or otherwise deficient video picture representations.

According to the invention, generally, image data is transformed in a two dimensional transform process to recover a frequency domain representation thereof. Then, the frequency domain representation is quantized to obtain an integer representation of the images, which are ordered by frequency. The process then re-computes the coefficients selective frequencies in a manner to add details to images in a video presentation. This is discussed in more detail below.

Referring again to the encoder 102, it further includes a variable length coder 130 that receives a quantized output from quantizer 126 and produces an output signal. The encoder further consists of an equivalent decoding module that includes an inverse quantizer 132, configured to also receive an output from the quantizer for transmission back to a feedback loop in the encoder. An inverse discrete cosine transformer 134 receives the inverse quantized output and generates a reconstructed block 146, which may be generally the difference between the current block and the reconstructed block. This output is summed in summation block 138 to produce reconstructed current block data 140. This is the combination of the output of the inverse discrete cosine transformer 134 and motion compensator 142. The motion compensator 142 receives inputs from the frame memory 116 and further communicates with motion estimator 120 to produce an output 144, the best match reconstructed block data from frame memory 116. Outputs from the motion estimator 120 and motion compensator 142 are combined in arithmetic unit 150 to complete the feedback loop of encoder 102. The data paths include the $i^{th}$ picture input 118, difference data 146, motion vectors 148 the picture output 125 to variable length encoder 130, and the feedback picture for processing in generalized encoder 102. This Figure has the assumptions that the $i^{th}$ picture exists in frame memory or storage 116, and that the i+$1^{th}$ picture is being encoded with motion estimation.

Still referring to the diagram of FIG. 1, the encoder components are provided herein for functional illustration of the invention used in conjunction with an encoding process, such as MPEG-2 encoding. However, and again, the invention is not limited to any particular circuit configured under any particular encoder embodiment, but is an improved method of quantizing a video picture. In the flow chart, for inter-frame coding with IPPP GOP structure, the pictures of the $i^{th}$ picture and the $(i+1)^{th}$ picture are processed to generate block motion. vectors. The block motion vectors predict where a block of pixels will be in a prior picture from the current block. For B frame coding, the block motion vectors predict where a block of pixels will be in a prior and/or subsequent picture from current block. As shown in FIG. 1A the motion vectors, once generated, are used for signaling the motion of the blocks of pixels from frame to frame.

In the encoding process, which can generate compliant bitstreams, the pictures of the $i^{th}$ picture and the $i+1^{th}$ picture are processed to generate motion vectors that are the form in which, for example, the $i+n^{th}$ (in general, they do not need to be contiguous, but can be.) and subsequent pictures are encoded and transmitted. An input picture 118 of a subsequent picture is transmitted to the motion estimation unit 120 of the encoder 102. Motion vectors 148 are formed as the output of the motion estimation unit 120. These vectors are used by the motion compensation unit 142 to retrieve block data from previous and/or future pictures, referred to as "reference" data, for output by this unit. One output of the motion compensation unit 142 is negatively or positively summed with the output from the motion estimation unit 120 and goes to the input of the discrete cosine transformer 122. The output of the discrete cosine transformer 122 is quantized in quantizer 126, where the novel process is performed in the transform coding randomization module 124, as discussed in more detail below. The output of the quantizer 126 is split into two outputs, 125 and 129. One output 125 goes to a downstream element, illustrated here as variable length decoder 130 for further compression and processing before transmission. The other output 129 goes through reconstruction of the encoded block of pixels for storage in frame memory 116. In the encoder shown for purposes of illustration, this second output 129 goes through an inverse quantization 132 and an inverse discrete cosine transform 134 to return a lossy version of the difference block. This data is summed with the output of the motion compensation unit 142 and returns a lossy version of the original picture to the frame memory 116.

Figure 2:
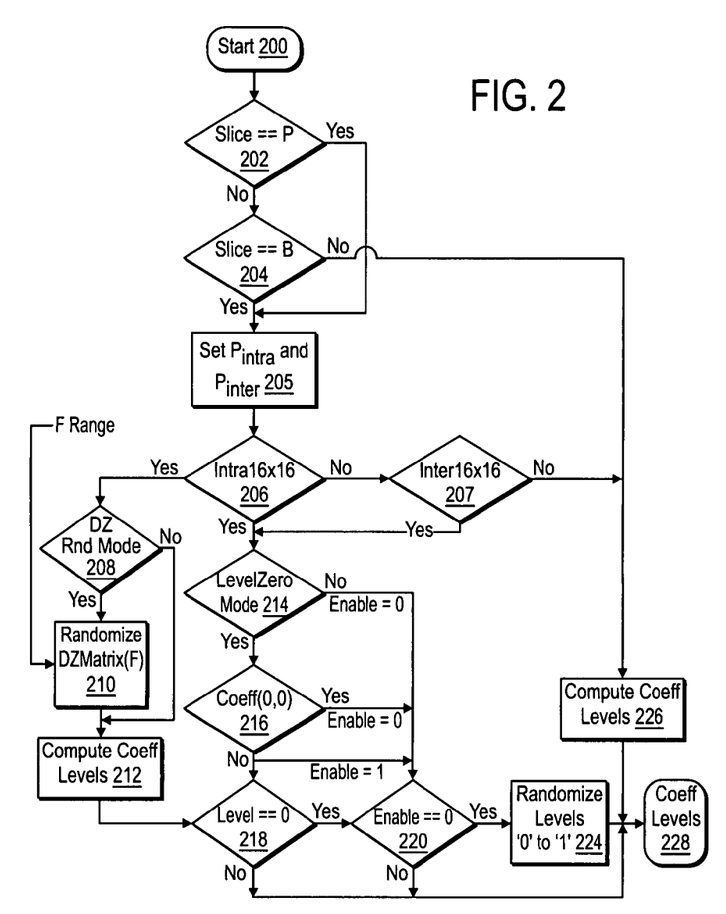
FIG. 2 is a flow chart illustrating one embodiment of the invention.

Referring to FIG. 2, a flow chart illustrating the process flow of the invention is illustrated. The process 200 begins at step 202, where it is determined whether a slice received is a P slice. If it is not a P slice, then the process proceeds to step 204 to determine whether the slice is a B slice. If it is not a B slice, then the process proceeds directly to step 226, where the coefficient levels are computed, and then generated in step 228. Thus, in a preferred embodiment, the processes beginning at steps 206 are limited to P and B slices.

The process then goes to step 205, where probability values are set for intra blocks and inter blocks. In this process, the probability values represent the probability of whether the respective blocks are randomized according to the level zero randomization mode. The intra block probability $p_{intra}$ value represents the probability of whether an intra block would be randomized in steps 210 and 224. Likewise, the inter block probability $p_{inter}$ value represents the probability of whether an inter block would be randomized in step 224. According to the invention, these values are set in a manner to trigger the randomization of coefficients in a manner that adds detail to a block that otherwise would be blurry, flat and untextured, or otherwise deficient in its depiction of an image to be represented. According to the invention, these values can be preset according to a particular application, or may be adjusted according to a user input or other external adjustment input. Also, the probability of intra and inter blocks can be set separately. For example, the intra block probability can be set high, and the inter block probability set low, thus increasing the probability that intra blocks will be randomized over inter blocks. In fact, the inter block randomization could effectively be disabled by setting the probability level very low. In a preferred embodiment, the probability assigned to the intra blocks, the intra block probability $p_{intra}$, should typically be a greater value than that assigned to the inter blocks, the inter block probability $p_{inter}$.

The process then proceeds to step 206, where it is determined whether the block is an Intra-16×16 block. If the answer is no in step 206, then the process proceeds to step 207 where it is determined whether the block is an inter 16×16 block. If the answer is no in step 207 and is also no in step 206, then the process proceeds directly to step 226, where the coefficient levels are computed, and then generated in step 228. If the answer is yes in step 206, then the block being processed is an intra 16×16 block, and the intra block probability $p_{intra}$ value is assigned. If the answer is no in step 206, but the answer is yes in step 207, then the block being processed is an inter 16×16 block, and the inter block probability $p_{inter}$ value is assigned.

If the answer is yes in step 206, the , then the process proceeds on two parallel procedure paths. In the first path, including steps 208, 210 and 212, the DZ Matriz Randomization process occurs. In the second path, steps 214 and 216, the Level Zero process occurs. In each of these processes, it is ultimately determined whether the intra 16×16 block is randomized in either step 210 and/or step 224. If, however the answer in step 206 is no, but the answer in step 207 is yes, then the block is an intra-luma block, and the process proceeds only in the second path that includes steps 214 and 216 and subsequent paths. If the answer at step 207 is not, then the block is not processed in either of the two paths, and the coefficients are computed in step 226.

In the first process path, the process proceeds to step 208, where it is determined whether the block is appropriate to process in the DZ Randomization mode. The DZ Randomization mode is a variable set external to this process as a result of picture quality requirements; it serves to bypass the randomization process 210 and to set the randomization probability. When DZ Randomization is equal to zero, then the DZRnd mode is not active, and step 210 is not performed; otherwise, a non-zero value will indicate the randomization probability. For example, if DZ Randomization mode is set to 0.01, it indicates that the probability of randomizing the DZ Matrix is 1%. In a preferred embodiment, this value is the same as $p_{intra}$, and applies to all the randomization processes, including 224 in FIG. 2 for intra blocks. As discussed above, again in a preferred embodiment, the probability for inter 16×16 blocks, $p_{inter}$, may be different than as $p_{intra}$, and thus the probability of randomizing a zero value for an inter 16×16 block would be less than the probability of randomizing in the dead zone or in the level zero mode compared to an inter 16×16 block. When Step 210 is performed, the maximum value is determined by F Range—another external variable—as illustrated in FIG. 2. In a typical application, the random probability will be very low (<0.1%) for high bit rates (>2 Mbps SD) and higher (>1%) for low bit rates (<2 Mbps). It should be clear to one skilled in the art that the random probability of each randomization process in this invention can be generated independently and according to different set of criteria.

In this procedure, for P-Slices and B-Slices only, once a block is identified as Intra 16×16 Luma, the DZMatrix is modified for the particular block by randomly selecting an offset from 0.0 to F and applying it to all the transform coefficients by means of f and $f_{DC}$. In practice, the value of F ranges typically from 0.0 to 0.5 (for high bit rates it will tend towards 0.0 and for low bit rates it will tend towards 0.5). After either of steps 208 or 210, the process proceeds to step 212, where the coefficient levels are computed. The range is determined by an external process that predicts the amount of blurriness in a block and adapts the value of F Range so that more randomization is used at lower bit rates. The value may be preset, or may be set by such an external process as a user adjustment or other adjustment method.

Referring back to step 206, if the answer is yes, then the other parallel path for an identified Intra 16×16 block, the slice data proceeds to step 214. Also, if the answer to the query in step 206 is not, but the query in step 207 is yes, then the block is an inter 16×16 block, and proceeds down the same path as the intra 16×16 block, the difference being that the respective blocks would have different block probabilities assigned, as discussed above, where an intra 16×16 block is assigned the intra block probability $p_{intra}$ an inter 16×16 block is assigned the inter block probability $p_{inter}$ value. In step 214, it is determined whether the slice is appropriate to process in Level Zero mode. If the answer is no, then Enable =0, indicating that randomization (discussed further below in step 224) is not to occur. If the answer is yes, then Enable =1 and randomization will occur in step 224. Level Zero is a variable set by an external process in a similar manner as described above for DZ Randomization mode. When Level Zero is set, all levels except DC are randomized. In practice, for low bit rates and for blocks that are likely to produce blurry results, the Level Zero variable is always set. If it is in Level Zero mode, then the process Level Zero Randomization of the Intra 16×16 blocks of the slice begins at step 216. There, it is determined whether the coefficients are DC (0,0). For this process, for P-Slices and B-Slices only, once the slice is identified with Intra 16×16 Luma blocks, for every coefficient except location (0,0) if the Level is equal to zero, randomly change the value to '1' prior to sign extension, i.e., the random value could be +/−1. There is the possibility, depending on the probability distribution of the random number generator, that more than one zero-level coefficient will be changed to +/−1 in the same transform kernel. Those skilled in the art will understand that this would be controlled by the setting of DZ Randomization mode and the nature of the random number generator.

If the coefficients are not zero in step 216, where the answer at step 216 is no, then Enable=1. The next step from there, and simultaneously after step 212, the first process, the process proceeds to step 218, where it is determined whether the level is zero. In this intersection of processes, step 212 proceeds to Step 218. Also, step 216 proceeds to step 218 if the coefficients are not zero.

If the Level=0 in step 218, then the process proceeds to step 220. If the answer is no at step 218, then the process bypasses step 220. At this intersection of step 220, if it is determined at step 214 that the process is not in Level Zero mode, then that process proceeds to step 220 as well. Also, after step 216, whether Enable is set to zero or set to one, the process proceeds to step 220. In step 220, it is determined whether Enable=1.

If the answer is yes, then the process goes to step 224, where the process randomizes Levels "0" to "1".

The final intersection occurs at the output 228 where the coefficient levels are produced. This occurs if, referring back to step 204, the slice is not a P or B slice. This also occurs if, and referring back to steps 206 and 207, there is no intra or inter 16×16 block slice. At this juncture, the coefficient levels are computed in step 226, where the third procedure, the Level Zero Randomization of Inter 16×16 blocks occurs. Thus, the slices have been identified as Inter 16×16 Luma blocks. For example, for every coefficient except location (0,0), if the Level is equal to zero, the process randomly changes the value to '1' prior to the sign extension, where the random value could be +/−1. There is the possibility, depending on the probability distribution of the random number generator, that more than one zero-level coefficient will be changed to +/−1 in the same transform kernel. The process then proceeds to step 228, where the coefficient levels are generated. This output at 228 also occurs if, at step 218, the answer is no, where Level does not equal 0. Finally, the output at step 228 occurs after the randomization step of 224. The result is an intelligently randomization of certain P and B type slices in a video picture.

It is important to note that, although the approach outlined above can be applied equally well to Intra ("I") slices, in a preferred embodiment, only P and B type slices are transformed using the novel method. Applying the methods to an I type slice would create a large amount of data bits that represent the reproduced image. This may defeat the purpose of achieving high compression ratios. However, depending on the frequency of I slices and the application, one may still perform the above randomization in certain circumstances according to the invention.

Also, in one implementation of the invention, still referring to FIG. 2, if the probability of generating a '1' is denoted with probability "p" and this probability is assigned to the DZMatrix procedure that includes process steps 208 through 212 and the level zero randomization of the Intra 16×16 luma blocks procedure including process steps 214 and 216 discussed above; Then, the a second probability p' used for the Level Zero randomization of the Inter 16×16 blocks procedure should be less than p, for example p'=0.01*p. The value of p may itself be a function of the frequency of the coefficient to be randomized as well as the amplitude of the coefficient prior to quantization. For example, coefficients that are "barely" small enough to be quantized to 0 might have a higher probability of being changed to an amplitude of non-zero.

To better control the overhead data created by randomly generating non-zero quantized coefficients, the encoding process selects the probabilities with which zero coefficients are changed to '1'. For example, when CAVLC is used for entropy coding of quantized coefficients, the encoding process selectively biases coefficients that will result in distribution patterns of non-zero coefficients that require fewer bits to encode in the transform block. The maximum number of zero coefficients that are changed to '1' are limited based on encoding requirements.

According to the invention, the pseudo random conversion of zero coefficients is selectively combined with the process of coefficient thresholding based on rate-distortion decisions. This is accomplished by modifying the quantization of the DeadZone and Transform Coefficient Level by randomizing a selected portion of the quantized, high frequency, integer terms. The randomization of Dead Zone and Transform Coefficient Level terms may be carried out either simultaneously or sequentially. In a preferred embodiment, they are carried out simultaneously. This is done by identifying Intra 16.times.16 Luma blocks in P-Slices and B-Slices, and randomly selecting an offset from 0.0 to a value between 0.0 and 0.5 and applying it to all transform coefficients in $$|L_{ij}| = \left(\left(|K_{ij}| \cdot \frac{(SF \cdot 2^{qbits})}{Q_{step}}\right) + (f \cdot 2^{qbits})\right) / 2^{qbits}$$

$$\text{sign}(L_{ij}) = \text{sign}(K_{ij})$$

and $$|L_{DCij}| = \left(\left(|K_{DCij}| \cdot \frac{(SF_{DC} \cdot 2^{qbits})}{Q_{step}}\right) + (f_{DC} \cdot 2^{qbits})\right) / 2^{qbits}$$

$$\text{sign}(L_{DCij}) = \text{sign}(K_{DCij})$$

and identifying Intra 16×16 Luma blocks P-Slices and B-Slices, where for every coefficient other than location (0,0) if the coefficient is equal to zero, randomly changing the value to '1' prior to sign extension; and identifying Inter 16.times.16 Luma blocks in P-Slices and B-Slices, where for every coefficient other than location (0,0) if the coefficient is equal to zero, randomly changing the value to '1' prior to sign extension.

Referring again to FIG. 2 more generally, the randomization procedures are illustrated that test whether a slice is P or B. In a preferred embodiment, the novel process is not applied to I slices, and thus a system configured under the preferred embodiment considers only P and B type picture slices. The process then tests if the block is an Intra block.

If the block is an intra block, the process tests if the Dead Zone is randomized, and if not, then the process tests whether the block is an inter block. The block is then randomized according to its assigned block probability, the block is processed according to the novel method, and coefficient levels are computed. This provides the coefficient levels for the P and B type slices.

The random number probability of each of the coefficient procedures are re-computations of the coefficients above is independently controllable. In practice, such adjustment methods are well known to those skilled in the art. For example, adjustments can be user controlled adjustments in a video device, where the amount of compression or level of randomization are adjusted. Alternatively, predetermined levels for dead zone randomization or level zero randomization can be preset for a device based on bandwidth and quality requirements; for instance, at very low bit rates the encoding process tends to reduce the value of high frequency coefficients, therefore, according to the present invention, LevelZero mode will be enabled. Other external methods for setting the levels of randomization and compression are well known to those in the art, and the enabling inputs that indicate which modes are active can vary for different systems configured according to the invention.

In practice, the lowest probability of generating a '1' should be assigned to procedure of level zero randomization of Inter 16×16 blocks, since changing many coefficients would lead to excessive increase in bit rate. According to the invention, the value '1' as described herein with respect to the processes and re-computations of coefficients is a nominal value that denotes change to any value, but in a preferred embodiment, this value is indeed '1'.

Figure 3:
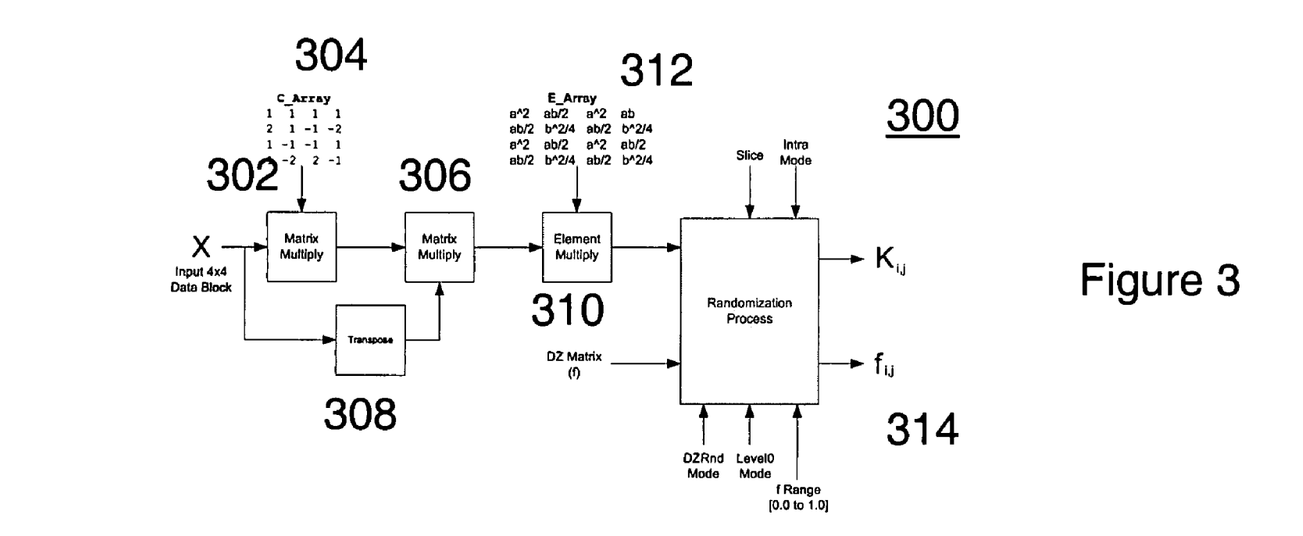
FIG. 3 is a diagrammatic view of one embodiment of the invention.

Referring to FIG. 3, the diagrammatic hardware system 300 is illustrated, where the process steps through the hardware of one embodiment are shown. Here, an input matrix X is multiplied in the matrix multiplier 302 by C_Array 304. X is simultaneously transposed in transpose unit 306, and the result is multiplied by the output of matrix multiplier 302. Element multiplier 310 multiplies the element array 312 with the output of matrix multiply 306. The result is then randomized by a randomization process unit 314. According to the invention, the randomization unit performs the novel process with inputs that include the slice, the determination of Intra or Inter mode, the dead zone matrix, a DZ randomization mode input, a level zero mode input, and the f range. Again, as discussed above, these inputs can be the product of adjustments that can be user controlled adjustments in a device, where the amount of compression or level of randomization are adjusted. Alternatively, predetermined levels for dead zone randomization or level zero randomization can be preset for a device. Following the example above, for specific conditions of bit rate and quality, randomization probability can be set to a value inversely proportional to the bitrate (probability=1/(bit rate)*10^6)%). For example, at 1 Mbps the probability of randomization will be 1%, and at 0.5 Mbps the probability will be 2%. In one exemplary embodiment, Level Zero adjustments are used only for bit rates lower than 1 Mbps. Other external methods for setting the levels of randomization and compression are well known to those in the art, and the enabling inputs that indicate which modes are active can vary for different systems configured according to the invention. The outputs of the system of FIG. 3 are $K_{i,j}$ and $f_{i,j}$.

Figure 4:
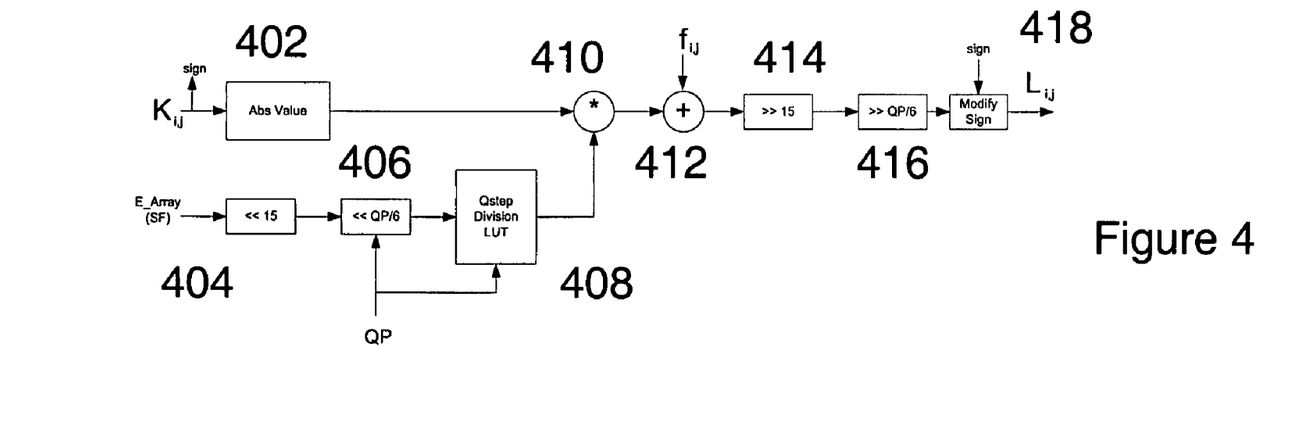
FIG. 4 is a diagrammatic view of one embodiment of the invention.

FIG. 4 illustrates a further step in randomization, that receives $K_{i,j}$ and $f_{i,j}$ from system 300 into circuit 400. The input $K_{i,j}$ is received at absolute value generator 402, that generates the absolute value of K. The E_Array (SF) is received and shifted fifteen times in shifter 404. The result is shifted QP/6 times in block 406, and its result is divided in the Qstep division LUT, 408, wherein both blocks 406 and 408 receive the QP value. This result is multiplied in block 410, then added to value $f_{i,j}$ from the randomization process 314 in adder 412, the result is then shifted 15 times in shifter 414, then shifted QP/6 times in block 416, its sign modified in block 418, and the result $L_{i,j}$ resulting.

For example, in one operating mode, the encoder algorithmically selects from a number of pre-determined patterns in the constellation formed by the positions of non-zero coefficients. The algorithm can be driven cyclically or pseudo-randomly to change only the coefficient positions designated by these constellation patterns. The patterns are selected so that, given the same number of non-zero coefficients, the rate needed to encode coefficients at such positions is low.

When the pattern selection is not random, it is indexed in three ways:

1) by the total number of non-zero coefficients after quantizing the original transform block;

2) by the position of the coefficient(s) with the maximum amplitude before quantizing the original transform block; or 3) by a combination of the above methods, for example a linear combination based on bit rate requirements.

The randomization mechanisms outlined above can be targeted to specific areas of each picture in the sequence. Using a specific area has the advantage of allowing more randomization without extreme increases in bit rate that result in using the technique for the entire picture.

According to the invention, generally, target areas for the randomization processes are those with high texture (high frequency detail) and moderate to high motion (when, for example, block average Luma changes greater than 25%, i.e., when the difference between collocated blocks in adjacent frames is more than 25%). These are the areas that are likely to be coded with insufficient bits in low bit rate conditions and that will produce blurred blocks in the picture. For such coded areas of high texture and high motion, the three randomization approaches outlined above may be used with the same relative probability.

The invention described herein greatly reduces the blurry appearance in isolated blocks in the picture. It achieves this goal by substituting blocks that are likely to produce blurry artifacts with randomized versions that contain enough high frequency detail to break the pattern of blurriness. There are several advantages that make this technique appealing for implementation. The method and system described herein reduces the perception of blurriness by addressing both coefficient level and offset randomization in a single framework. It can be applied to all coding slices (Intra, Inter-P, Inter-B slices). Moreover, it offers the advantage of easy selection of blurry blocks without examining frequency content. Only a simple test for zero coefficient is required and does not require analysis of frequency response of temporally and/or spatially neighboring blocks, although such information may be incorporated so as to improve the setting of the method and "aggressiveness" (e.g. via the setting of p) of the randomization method. This is accomplished by the simple replacement of zero coefficients by a level of +/−1 at each frequency transform coefficient, where the controlled randomization probability restrains bit rate increase, although replacements of zero coefficients by a level of amplitudes greater than 1 and/or adding an intelligently selected noise on top of the original unquantized transform coefficients is also perceivable.

The methods described herein can be easily applied on a regional basis. In this case, only specific areas of the pictures are subject to the randomization process. These areas are identified by an external process, which is part of the rate control algorithms for optimal bit rate/quality targets. Such algorithms are well known to those skilled in the art. For example, adjustments can be user controlled adjustments in a video device, where the amount of compression or level of randomization are adjusted.

The invention may be implemented, for example, in hardware, software (perhaps as an operating system element), or a combination of the two, a dedicated processor, or a dedicated processor with dedicated code. If in software, the invention is a process that executes a sequence of machine-readable instructions, which can also be referred to as code. These instructions may reside in various types of signal-bearing media. In this respect, the invention provides a program product comprising a signal-bearing medium or signal-bearing media tangibly embodying a program of machine-readable instructions executable by a digital processing apparatus to perform a novel method of pre-filtering video signals prior to being encoded.

The signal-bearing medium may comprise, for example, memory in server. The memory in the server may be non-volatile storage, a data disc, or even memory on a vendor server for downloading to a processor or a quantizer for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++". Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

While the invention has been described with respect to certain preferred embodiments and exemplifications, it is not intended to limit the scope of the invention thereby, but solely by the claims appended hereto and their equivalents.

The invention claimed is:

1. A method of encoding image data of a video signal having motion content comprising the steps of:
    (A) transforming the image data in a two dimensional transform process performed by a circuit to generate a frequency domain representation thereof;
    (B) quantizing the frequency domain representation to obtain an integer representation having a plurality of coefficients;
    (C) generating a modified representation by selectively re-computing one or more of the coefficients that have a zero value due to the quantizing;
    (D) generating a reference picture based on the modified representation; and
    (E) generating a motion estimation of a given block of the video signal relative to the reference picture.

2. The method according to claim 1, wherein re-computing includes the sub-steps of:
    randomizing an intra block in a dead zone mode;
    randomizing the intra block in a level zero mode; and
    randomizing an inter block in the level zero mode.

3. The method according to claim 1, further comprising the step of:
    separately identifying one or more intra luma blocks and one or more inter luma blocks in a slice.

4. The method according to claim 1, wherein step (B) comprises the sub-step of:
    quantizing the coefficients of one or more intra blocks that occur within a dead zone according to a dead zone matrix, and
    step (C) comprises the sub-steps of:
    re-computing the coefficients of the intra blocks having the zero value coefficients by randomly replacing the zero value coefficients with a non-zero coefficient according to a first randomization number; and
    re-computing the coefficients of one or more inter blocks having the zero value coefficients by randomly replacing the zero value coefficients with the non-zero coefficient according to a second randomization number, the second randomization number being different than the first randomization number.

5. The method according to claim 4, wherein the first randomization number and the second randomization number are a function of (i) a respective frequency of the coefficient to be randomized and (ii) a respective amplitude of the coefficient prior to quantization.

6. The method according to claim 1, further comprising the step of:
    adding random noise to the frequency domain representation.

7. The method according to claim 1, further comprising the step of:
    adding random noise to the integer representation.

8. The method according to claim 1, wherein re-computing the coefficients includes the sub-steps of:
  setting a first randomization number corresponding to a plurality of intra-luma blocks and a second randomization number corresponding to a plurality of inter-luma blocks;
  testing for the intra-luma blocks, and, if one or more of the intra-luma blocks are detected: (i) testing for one or more dead zone blocks and, if the dead zone blocks are detected in the intra-luma blocks, quantizing the dead zone blocks according to a dead zone matrix; and (ii) testing for the zero value coefficients and, if one or more of the zero value coefficients are detected, randomly changing the zero value coefficients to non-zero coefficients according to the first randomization number; and
  testing for the inter-luma blocks, and, if one or more of the inter-luma blocks are detected, testing for the zero value coefficients and, if one or more of the zero value coefficients are detected, randomly changing the zero value coefficients to non-zero coefficients according to the second randomization number.

9. The method according to claim 1, wherein the coefficients are analyzed and randomly replaced after quantization with recomputed coefficients to add image details that reduce artifacts in a video presentation, wherein re-computing the coefficients comprises the sub-steps of:
  if a block occurs in a dead zone, randomizing the coefficients of the block according to a dead zone randomization process; and
  if the block occurs while in a level zero mode and if the coefficients have the zero value, randomizing the coefficients of the block according a level zero randomization process.

10. The method according to claim 9, wherein the dead zone randomization process and the level zero randomization process are performed simultaneously.

11. The method according to claim 9, wherein the dead zone randomization process and the level zero randomization process are performed sequentially.

12. The method according to claim 9, wherein the dead zone randomization process comprises the sub-steps of:
  identifying one or more Intra 16×16 Luma blocks;
  randomly selecting an offset from a range of values, and applying the offset to the coefficients corresponding to the one or more Intra 16×16 Luma blocks.

13. The method according to claim 12, wherein identifying the one or more Intra 16×16 Luma blocks includes identifying the one or more Intra 16×16 Luma blocks in P-Slices and B-Slices only.

14. The method according to claim 9, wherein the dead zone randomization process comprises:
  qbits=15+floor(QP/6);

$$|L_{ij}| = \left(\left(|K_{ij}| \cdot \frac{(SF \cdot 2^{qbits})}{Q_{step}}\right) + (f \cdot 2^{qbits})\right) / 2^{qbits}$$

$$\text{sign}(L_{ij}) = \text{sign}(K_{ij})$$

and $$|L_{DCij}| = \left(\left(|K_{DCij}| \cdot \frac{(SF_{DC} \cdot 2^{qbits})}{Q_{step}}\right) + (f_{DC} \cdot 2^{qbits})\right) / 2^{qbits}$$

$$\text{sign}(L_{DCij}) = \text{sign}(K_{DCij})$$

wherein f and $f_{DC}$ are respective offset values, QP is a quantization parameter and $Q_{step}$ is a quantization step size.

15. The method according to claim 14, wherein a dead zone matrix is (i) modified for a particular block by randomly selecting offset values from 0.0 to 0.5 and (ii) applied to all of the coefficients of the particular block by way of f and $f_{DC}$.

16. The method according to claim 1, further comprising the step of:
  randomizing hi-frequency ones of the coefficients at selective frequencies in a manner that reduces artifacts causing blurry images in a video presentation.

17. The method according to claim 1, comprising the step of:
  modifying a quantization dead zone parameter and a transform coefficient level parameter to randomize at least one of (i) a quantized term, (ii) a high frequency term and (iii) an integer term.

18. The method according to claim 1, further comprising the steps of:
  identifying one or more intra 16×16 luma blocks corresponding to a level zero randomization process; and
  for every coefficient of the one or more intra 16×16 luma blocks other than at location (0,0), and if the coefficient has the zero value, randomly changing the zero value to a one value prior to a sign extension.

19. The method according to claim 1, further comprising the steps of:
  identifying one or more Inter 16×16 Luma blocks corresponding to a level zero randomization process; and
  for every coefficient of the one or more Inter 16×16 Luma blocks other than at location (0,0), and if the coefficient has the zero value, randomly changing the zero value to a one value prior to a sign extension.

20. A device comprising:
  an input configured to receive image data of a video signal having motion content;
  a transform module configured to transform the image data in a two dimensional transform process to generate a frequency domain representation thereof;
  a quantizer configured to (i) quantize the frequency domain representation to obtain an integer representation having a plurality of coefficients and (ii) generate a modified representation by selectively re-computing one or more of the coefficients that have a zero value due to the quantizing;
  a feedback path configured to generate a reference picture based on the modified representation; and
  a motion estimation module configured to generate a motion estimation of a given block of the video signal relative to the reference picture.

21. The device according to claim 20, further comprising a decision module configured to identify one or more intra luma blocks, wherein the quantizer is further configured to re-compute the coefficients by performing at least one of (i) randomizing the one or more intra luma blocks in a dead zone, (ii) randomizing the one or more intra luma blocks having the zero value coefficients and (iii) randomizing an inter luma block having the zero value coefficients.

22. The device according to claim 20, further comprising:
  a first decision module configured to identify one or more intra luma blocks, wherein the quantizer is further configured to (i) quantize the one or more intra luma blocks in a dead zone according to a dead zone matrix and (ii) re-compute the coefficients by randomizing the one or more intra luma blocks having the zero value coefficients according to a first randomization number; and
  a second decision module configured to identify one or more inter-luma blocks, wherein the quantizer is further configured to re-compute the coefficients by randomizing the one or more inter-luma blocks having the zero value coefficients according to a second randomization number.

23. The device according to claim 20, wherein the quantizer is further configured to analyze and replace the coefficients after quantization.

24. The device according to claim 20, wherein the quantizer is further configured to recompute the coefficients by randomizing hi-frequency ones of the coefficients at selective frequencies in a manner that reduces artifacts causing blurry images in a video presentation.

25. The device according to claim 20, wherein the quantizer is further configured to re-compute the coefficients by (i) testing for the zero value coefficients, where, if one or more of the zero value coefficients are found, randomly replacing the zero value coefficients with a non-zero coefficient.

26. The device according to claim 20, wherein the quantizer is further configured to perform a level zero randomization of one or more Intra Luma blocks; and for every coefficient of the one or more Intra Luma blocks other than at location (0,0), and if the coefficient has the zero value, randomly changing the zero value to a non-zero value prior to a sign extension.

27. The device according to claim 20, wherein the quantizer is further configured to analyze and replace the coefficients after quantization with recomputed coefficients to add image details that reduce artifacts in a video presentation, wherein re-computing the coefficients comprises:

if a block occurs in a dead zone, randomizing the coefficients of the block according to a dead zone randomization process; and if the block occurs while in a level zero mode and if the coefficients have the zero value, randomizing the coefficients of the block according a level zero process.

28. The device according to claim 27, wherein the dead zone randomization process and the level zero randomization process are performed substantially simultaneously.

29. The device according to claim 27, wherein the dead zone randomization process and the level zero randomization process are performed sequentially.

30. The device according to claim 27, wherein the dead zone randomization process comprises (i) identifying one or more Intra 16×16 Luma blocks, (ii) randomly selecting at least one offset from a range of values and (iii) applying the at least one offset to the coefficients to the one or more Intra 16×16 Luma blocks.

31. The device according to claim 27, further comprising an adjustment mechanism configured to adjust an amount of the randomization.

32. The device according to claim 20, wherein the device is further configured to separately identify one or more intra luma blocks and one or more inter luma blocks in a slice.

33. The device according to claim 32, wherein the quantizer is further configured to randomize the one or more intra luma blocks according to a first randomization number and to randomize the one or more inter luma blocks according to a second randomization number.

34. The device according to claim 33, wherein the first randomization number and the second randomization number are a function of (i) a respective frequency of the coefficient to be randomized and (ii) a respective amplitude of the coefficient prior to quantization.

35. The device according to claim 20, further comprising:

a probability setting module configured to set a first randomization number corresponding to a plurality of intra-luma blocks and a second randomization number corresponding to a plurality of inter-luma blocks;

an intra-luma testing module configured to test for one or more of the intra-luma blocks;

a dead zone testing module configured to test for one or more dead zone blocks in the intra-luma blocks and, if the dead zone blocks are detected, to quantize the dead zone blocks according to a dead zone matrix; and a zero coefficient test module configured to test for the zero value coefficients in the intra-luma blocks and the inter-luma blocks and, if one or more of the zero value coefficients are detected, (i) randomly changing the zero value coefficients of the intra luma blocks to non-zero coefficients according to the first randomization number and (ii) randomly changing the zero value coefficients of the inter-luma blocks to the non-zero coefficients according to the second randomization number.

36. A system comprising:

means for transforming image data of a video signal having motion content in a two dimensional transform process to generate a frequency domain representation thereof;

means for (i) quantizing the frequency domain representation to obtain an integer representation having a plurality of coefficients and (ii) generating a modified representation by selectively re-computing one or more of the coefficients that have a zero value due to the quantizing;

means for generating a reference picture based on the modified representation; and means for generating a motion estimation of a given block of the video signal relative to the reference picture.

37. The system according to claim 36, wherein re-computing includes:

means for randomizing an intra block in a dead zone mode;

means for randomizing the intra block in a level zero mode; and means for randomizing an inter block in the level zero mode.

38. The system according to claim 36, further comprising means for separately identifying one or more intra luma blocks and one or more inter luma blocks in a slice.

39. The system according to claim 36, wherein (i) quantizing includes means for quantizing the coefficients of one or more intra blocks that occur within a dead zone according to a dead zone matrix, and (ii) re-computing the coefficients includes means for (a) re-computing the coefficients of one of the intra blocks having the zero value coefficients with a non-zero coefficient according to a first randomization number and (b) re-computing one or more inter blocks having the zero value coefficients by randomly replacing the zero value coefficients with the non-zero coefficient according to a second randomization number, the second randomization number being different than the first randomization number.

40. The system according to claim 39, wherein the first randomization number and the second randomization number are a function of (i) a respective frequency of the coefficient to be randomized and (ii) a respective amplitude of the coefficient prior to quantization.

41. The system according to claim 36, further comprising means for adding random noise to the frequency domain representation.

42. The system according to claim 36, further comprising means for adding random noise to the integer representation.

43. The system according to claim 36, wherein re-computing the coefficients includes:

means for setting a first randomization number corresponding to a plurality of intra-luma blocks and a second randomization number corresponding to a plurality of inter-luma blocks;

means for testing for the intra-luma blocks, and, if one or more of the intra-luma blocks are detected (i) testing for one or more dead zone blocks and, if the dead zone blocks are detected in the intra-luma blocks, quantizing the dead zone blocks according to a dead zone matrix; and (ii) testing for the zero value coefficients and, if the zero value coefficients are detected, randomly changing the zero value coefficients of the intra-luma blocks to non-zero coefficients according to the first randomization number; and means for testing for the inter-luma blocks, and, if one or more of the inter-luma blocks are detected, testing for the zero value coefficients and, if one or more of the zero value coefficients are detected, randomly changing the zero coefficients of the inter-luma blocks to non-zero coefficients according to the second randomization number.

44. The system according to claim 36, further comprising (i) means for analyzing the coefficients and (ii) means for randomly replacing the coefficients after quantization with recomputed coefficients to add image details that reduce artifacts in a video presentation, wherein:

if a block occurs in a dead zone, the system is configured to randomize the coefficients of the block according to a dead zone randomization process; and if the block occurs while in a level zero mode and if the coefficients have the zero value, the system is configured to randomize the coefficients of the block according a level zero randomization process.

45. The system according to claim 44, wherein the dead zone randomization process and the level zero randomization process are performed simultaneously.

46. The system according to claim 44, wherein the dead zone randomization process and the level zero randomization process are performed sequentially.

47. The system according to claim 46, wherein the dead zone randomization process comprises:

qbits=15+floor(QP/6);

$$|L_{ij}| = \left(\left(|K_{ij}| \cdot \frac{(SF \cdot 2^{qbits})}{Q_{step}}\right) + (f \cdot 2^{qbits})\right) / 2^{qbits}$$

$$\text{sign}(L_{ij}) = \text{sign}(K_{ij})$$

and $$|L_{DCij}| = \left(\left(|K_{DCij}| \cdot \frac{(SF_{DC} \cdot 2^{qbits})}{Q_{step}}\right) + (f_{DC} \cdot 2^{qbits})\right) / 2^{qbits}$$

-continued $$\text{sign}(L_{DCij}) = \text{sign}(K_{DCij})$$

wherein f and $f_{DC}$ are respective offset values, QP is a quantization parameter and $Q_{step}$ is a quantization step size.

48. The system according to claim 47, wherein the system is configured to modify a dead zone matrix corresponding to a particular block with (i) means for randomly selecting offset values from 0.0 to 0.5 and (ii) means for applying the dead zone matrix to all of the coefficients of the particular block by way of f and $f_{DC}$.

49. The system according to claim 44, wherein, the dead zone randomization process includes:

means for identifying one or more Intra 16×16 Luma blocks;

means for randomly selecting an offset from a range of values; and means for applying the offset to the coefficients of the one or more Intra 16×16 Luma blocks.

50. The system according to claim 49, wherein the means for identifying the one or more Intra 16×16 Luma blocks includes means for identifying the one or more Intra 16×16 Luma blocks in P-Slices and B-Slices only.

51. The system according to claim 36, further comprising means for randomizing hi-frequency ones of the coefficients at selective frequencies in a manner that reduces artifacts causing blurry images in a video presentation.

52. The system according to claim 36, further comprising means for modifying a quantization dead zone parameter and a transform coefficient level parameter to randomize at least one of (i) a quantized term, (ii) a high frequency term and (iii) an integer term.

53. The system according to claim 36, further comprising:

means for identifying one or more intra 16×16 luma blocks corresponding to a level zero randomization process; and for every coefficient of the one or more intra 16×16 luma blocks other than at location (0,0), and if the coefficient has the zero value, means for randomly changing the zero value to a one value prior to a sign extension.

54. The system according to claim 36 further comprising:

means for identifying one or more Inter 16×16 Luma blocks corresponding to a level zero randomization process; and for every coefficient of the one or more Inter 16×16 Luma block other than at location (0,0), and if the coefficient has the zero value, randomly changing the zero value to a one value prior to a sign extension.

* * * * *